(12) United States Patent
Derrien et al.

(10) Patent No.: US 10,357,915 B2
(45) Date of Patent: Jul. 23, 2019

(54) METHOD AND MACHINE FOR PRODUCING CONTAINERS BY INJECTING A LIQUID INSIDE SUCCESSIVE PREFORMS

(71) Applicant: DISCMA AG, Hunenberg (CH)

(72) Inventors: Mikael Derrien, Octeville sur Mer (FR); Pascal Haboury, Octeville sur Mer (FR)

( * ) Notice: Subject to any disclaimer, the term of this patent is extended or adjusted under 35 U.S.C. 154(b) by 213 days.

(21) Appl. No.: 15/319,996

(22) PCT Filed: Jun. 18, 2015

(86) PCT No.: PCT/EP2015/063675
§ 371 (c)(1),
(2) Date: Dec. 19, 2016

(87) PCT Pub. No.: WO2015/193412
PCT Pub. Date: Dec. 23, 2015

(65) Prior Publication Data
US 2017/0129157 A1    May 11, 2017

(30) Foreign Application Priority Data

Jun. 18, 2014  (EP) .................................. 14305942

(51) Int. Cl.
*B29C 49/06* (2006.01)
*B29C 49/42* (2006.01)
(Continued)

(52) U.S. Cl.
CPC .......... *B29C 49/06* (2013.01); *B29C 49/4252* (2013.01); *B29C 49/46* (2013.01);
(Continued)

(58) Field of Classification Search
CPC .. B29C 2049/4664; B29C 2949/78521; B29C 2949/00; B29C 2949/78008;
(Continued)

(56) References Cited

U.S. PATENT DOCUMENTS

| | | |
|---|---|---|
| 4,054,629 A | 10/1977 | Wang et al. |
| 2010/0140280 A1 | 6/2010 | Burke et al. |

(Continued)

FOREIGN PATENT DOCUMENTS

| | | |
|---|---|---|
| DE | 102012102073 A1 | 9/2013 |
| DE | 102012102357 A1 | 9/2013 |

(Continued)

*Primary Examiner* — Stella K Yi
(74) *Attorney, Agent, or Firm* — Eric J. Sosenko; Jonathan P. O'Brien; Honigman LLP

(57) ABSTRACT

A method of analyzing preforms for potential bursting during forming and filling by injecting an incompressible liquid to shape the successive heating preforms into containers and fill the containers. The method defines at least one stress parameter correlated to the internal stress of the thermoplastic material of the preform and defines a range of acceptable values for the stress parameter. The method includes analyzing each successive initial preform and each successive heated preform, determining a value of the stress parameter, comparing the determined value to a range of acceptable values, and emitting an output signal when the determined value is outside the acceptable range of values.

15 Claims, 4 Drawing Sheets

(51) Int. Cl.
*B29C 49/46* (2006.01)
*B29C 49/78* (2006.01)
*B29L 31/00* (2006.01)
*B29K 101/12* (2006.01)

(52) U.S. Cl.
CPC ...... *B29C 49/78* (2013.01); *B29C 2049/4664* (2013.01); *B29C 2949/78184* (2013.01); *B29C 2949/78386* (2013.01); *B29C 2949/78504* (2013.01); *B29K 2101/12* (2013.01); *B29L 2031/7158* (2013.01)

(58) Field of Classification Search
CPC .. B29C 2949/7838; B29C 2949/78386; B29C 29/46; B29C 49/78
See application file for complete search history.

(56) References Cited

U.S. PATENT DOCUMENTS

| | | |
|---|---|---|
| 2010/0140835 A1 | 6/2010 | Sun et al. |
| 2011/0135778 A1 | 6/2011 | Andison et al. |
| 2015/0321413 A1* | 11/2015 | Deau ................. B29C 49/78 700/110 |

FOREIGN PATENT DOCUMENTS

| | | |
|---|---|---|
| WO | 2006092651 A1 | 9/2006 |
| WO | 2014075770 A1 | 5/2014 |

\* cited by examiner

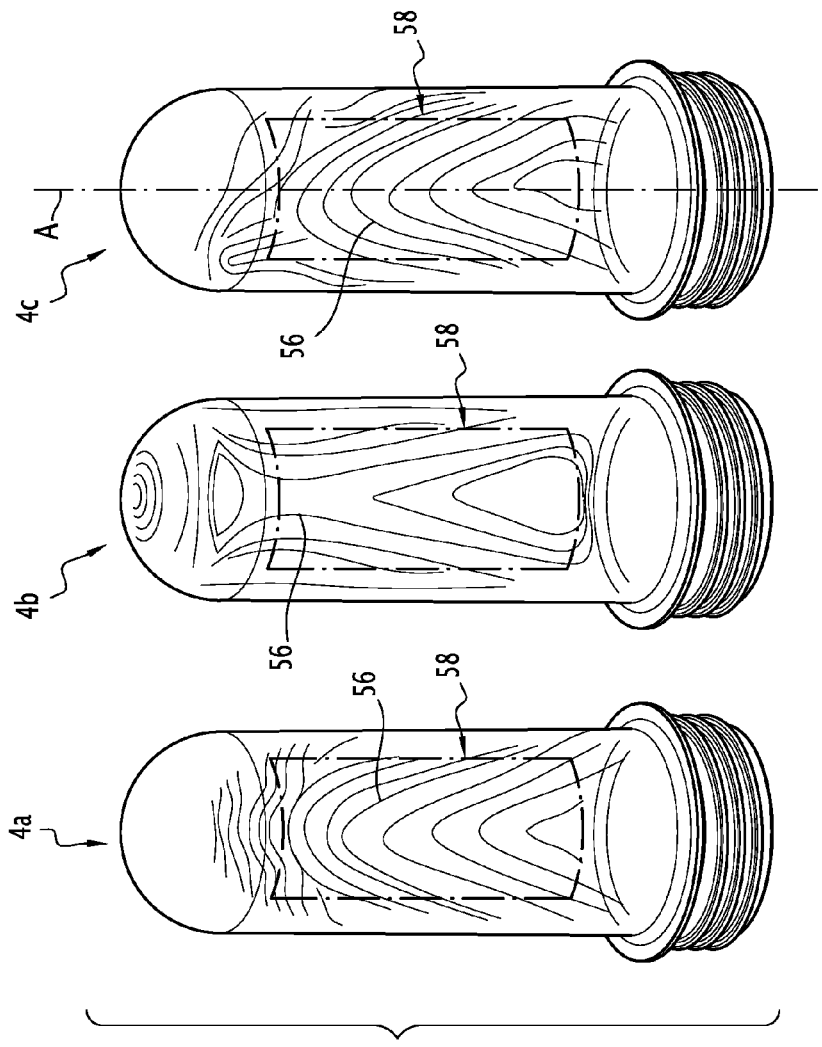
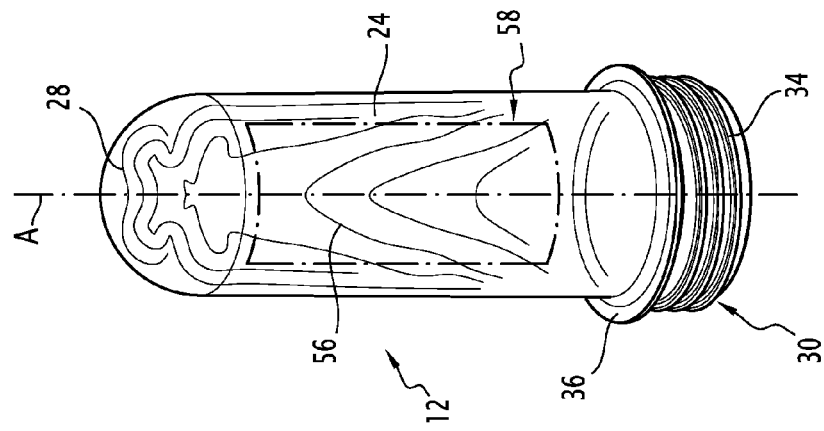

METHOD AND MACHINE FOR PRODUCING CONTAINERS BY INJECTING A LIQUID INSIDE SUCCESSIVE PREFORMS

TECHNICAL FIELD OF THE INVENTION

The present invention relates to a method for producing containers from successive preforms by injecting a liquid inside the successive preforms.

The invention also relates to a machine for producing containers carrying out such a method.

The invention relates to the field, known as hydro forming, of forming containers from a preform using an incompressible liquid to deform the preform.

In the application, "liquid" has a physical meaning. It designates any incompressible and able to flow medium. The liquid can have a low viscosity (like water or alcohol), a medium viscosity (like eatable oil or soup), or a high viscosity (like yoghurt or creamy product). The liquid can be homogeneous or not homogeneous (including fruit pulp or bits of foodstuff). It is not limited to foodstuff. The incompressible liquid may be for example water, or other beverages, body care products, home and garden care products, medical fluids, fuels, operating fluids, and the like.

BACKGROUND

The preforms used in such a method and machine are traditionally produced by injecting a thermoplastic material, such as polyethylene terephthalate (PET), in an injection cavity. The produced preforms are then fed to the machine for producing containers, wherein each preform is first heated to a temperature greater than the vitreous transition temperature and lower than the crystallization temperature of the thermoplastic material of the preform and then is formed into a container by injecting an incompressible liquid inside the heated preform, the incompressible liquid filling the shaped container.

Such a method is known and allows obtaining in a continuous and reproducible manner and at a high rate, containers, for example bottles of any shape and content, which are robust and filled with liquid. The liquid injected in the containers is for example the end liquid provided to the user of the containers.

Document US 2011/135778 A1 describes a method for simultaneously forming and filling a plastic container.

However, in some cases, the containers are not properly shaped and are susceptible of bursting inside the molds in which they are produced. Indeed, the preforms are subjected to a rapid shift in temperature since the preforms have been heated and are filled with a liquid, which is generally at a temperature below the temperature of the preform. Such a change of temperature can lead to malformation of the containers if the cooling of the thermoplastic material of the containers is not homogenous. When such an event occurs, the liquid injected in the preform is spilled and soils the machine for producing the containers and the machine has to be stopped in order to be cleaned before production of containers can continue. Consequently, the bursting of a container greatly reduces the throughput of the machine since the machine is stopped during the cleaning operations.

One of the aims of the invention is to overcome this drawback by proposing a method and a machine for producing containers wherein the bursting of containers during the forming and filling step can be prevented.

Document US 2010/140280 describes a method for producing a bottle, where hoop stiffness and bottle geometry are used to control the bottle shape resulting from deformation caused by vacuum creation as water vapor permeates outwardly through the bottle walls.

Document DE 10 2012 102 357 describes a device comprising a control apparatus to control the device depending on the temperature of performs.

Document DE 10 2012 102 073 A1 describes a method for controlling preforms using at least a camera. Document WO 2014/075770 A1 describes a method for controlling the neck of a preform using a stereoscopic objective.

One of the aims of the invention is to offer different methods and machines for producing containers wherein the bursting of containers during the forming and filling step can be prevented.

SUMMARY OF THE INVENTION

To this end, the invention relates to a method for producing containers from successive initial preforms made of a thermoplastic material, comprising the steps of:
  feeding successive initial preforms to a heating station,
  heating the successive initial preforms in the heating station resulting in successive heated preforms,
  feeding the successive heated preforms to a forming station,
  injecting an incompressible liquid into each of the successive heated preforms to shape each of the successive heated preforms into containers and to fill the containers with the incompressible liquid in the forming station,
defining at least one stress parameter correlated to the internal stress of the thermoplastic material and defining a range of acceptable values for the stress parameter, the method further comprising analyzing each of the successive initial preforms and each of the successive heated preforms, said analyzing step comprising the steps of:
  determining a determined value of the stress parameter for each of the successive initial preforms and each of the successive heated preforms,
  comparing the determined value to the range of acceptable values,
  emitting an output signal when the determined value is outside the range of acceptable values.

The method according to the invention therefore allows checking the quality of the preforms before they are subjected to the forming and filling step. The applicant has reached the conclusion that the bursting of a container is often due to a poor quality of the preform before the liquid product injection step and in particular to the internal stress of the thermoplastic material of the preforms. The internal stress comes from the injection method of the thermoplastic material used to produce the preforms and is "liberated" or released during the heating step of the preforms. When the internal stress in a preform is too high and/or is not homogenously distributed, the forming and filling step of said preform can occur in an unsatisfactory manner and lead to bursting. Consequently, the quality of the injection of the thermoplastic material to produce the preforms has a high impact on the result of the forming and filling step of the containers obtained from said preforms. Checking the quality of the preforms prior the forming and filling step can therefore help preventing the bursting of the containers since one can make sure that only preforms having a satisfactory internal stress are formed into containers.

Checking the quality of the preforms before and after the heating step enables one to measure the impact of the release of the internal stress on the quality of the preforms before the injection step.

The impact of the internal stress is all the more important when the heating temperature of the preforms is far above the glass transition temperature and close to and bellow the crystallization temperature of the thermoplastic material of the preforms. Such a heating temperature, in the range of 130° C. for PET, is required for preforms subjected to a hydro forming process since the injection of liquid leads to a rapid cooling down of the thermoplastic material, the cooling making the thermoplastic material become rigid and thus preventing further deformation of the container. Consequently, the temperature of the thermoplastic material has to be high enough for the container to be completely formed before becoming rigid.

In this case, if the internal stress is not homogenously distributed in the preform and/or if the intensity of the internal stress is too high, the expanding of the preform is very likely to provoke a bursting of the container during the forming and filling step.

The method according to the invention, by proposing an analysis of a stress parameter representing the internal stress of the thermoplastic material coming from the injection method of the preforms, allows checking the quality of the preforms prior the forming and filling step and preventing forming and filling a preform of unsatisfactory quality. Consequently, the risks of bursting of containers are greatly reduced, which reduces the need of stopping the machine and improves the throughput of said machine.

According to another feature of the invention, the stress parameter correlated to the internal stress of the thermoplastic material is the maximal circumferential dispersion of the internal stress of the thermoplastic material, measured along the height of the analyzed preform.

By choosing this stress parameter, correlated with the distribution of the internal stress in the material of the preform, the quality of the preform can be verified by a simple optic comparison of the preform, before and after it has been subjected to the heating step.

To this end, according to a feature of the invention, the step of determining the stress parameter is performed on a preform before and after the heating step, and prior to the injection of an incompressible liquid into said heated preform.

The release of the internal stress during the heating step allows making visible the impact of the internal stress on the preform after it has been heated. The maximal lateral dispersion is therefore visible and manifests itself by an irregularity in the shape of the preform, for example by an abnormal bending of the preform in an axial plane containing the axis of the preform, known as the "banana effect". It is therefore possible to determine that a preform is unsatisfactory by comparing the shape of the analyzed preform with the shape of a satisfactory preform, i.e. with the shape of a preform made of a thermoplastic material having an internal stress below an acceptable maximal value.

According to other features of the invention:
the step of determining the value of the stress parameter is performed by acquiring at least an image of the heated preform and the step of comparing is performed by comparing the acquired image to at least a reference image of a reference heated preform having an acceptable maximal lateral flexion value; and
the heated preform is moved in rotation at least during the step of determining the value of the stress parameter, said step being performed by acquiring a plurality of images of the heated preform at different angular positions of said analyzed heated preform and by processing the acquired images in order to identify at least one image corresponding the maximal lateral flexion of the analyzed preform, the step of comparing being performed by comparing said identified acquired image to said reference image.

According to a variant of the invention, the step of determining the value of the stress parameter is performed by acquiring at least an image of the initial preform and at least an image of the heated preform. The at least one image of initial preform and the at least one image of the same preform after heating are used by a calculator to determine a maximum real deformation of the preform during the heating step of the preform. Then, during a comparison step, the maximum real deformation is compared to an acceptable maximal lateral flexion value that could be defined by a reference image of a reference heated preform.

Consequently, simply by taking pictures or by making a film of an analyzed preform, one can determine if the preform is satisfactory or not.

According to another feature of the method according to the invention, the stress parameter is the variation of height and/or the exterior diameter of a body of an analyzed preform before and after the heating step of the analyzed preform, the step of determining the value of the stress parameter comprising a step of measuring the height and/or the exterior diameter of a body of the preform before the heating step, a step of measuring the height and/or the exterior diameter of a body of the preform after the heating step and a step of determining the variation of the height and/or of the exterior diameter of a body.

Another phenomenon related to the distribution of the internal stress can be observed by measuring the variation of height of the preform according to its axial direction before heating and after heating. If this variation is outside the satisfactory range, the preform is likely to burst during the forming and filling step. The variation of height can also be determined by taking pictures of the analyzed preform. An additional image of the preform before heating is acquired.

According to other features of the invention:
the stress parameter is the intensity of the internal stress of the thermoplastic material of the analyzed preform; and
the step of determining the value of a stress parameter from the at least one stress parameter is performed by exposing the analyzed initial preform to a circularly light and by acquiring through a second crossed circular polarizer the interference image or film of the incident polarized light passed through the initial preform and the step of comparing is performed by comparing the acquired image or film to the interference image or film of a polarized light passed through one or several reference preforms, the reference preform having a stress parameter value in or at the extreme of the acceptable values range.

The analysis of the interference image of a polarized light passed through the analyzed preform allows determining the intensity of the internal stress of the material of the preform before the preform is heated, which means that this analysis can be performed upstream of the heating station and provides an alert about drifting of the initial preforms.

According to another feature of the invention, the step of injecting an incompressible liquid into the heated preform is not performed when the output signal has been emitted after the step of comparing has been performed for the analyzed preform, the analyzed preform being preferably evacuated before the step of injecting an incompressible liquid.

The method according to the invention is adapted such that only satisfactory preforms are formed into containers and the containers are filled, which greatly reduces the risks of bursting of the preforms during the forming and filling step.

According to other features of the invention:
the output signal is an audible and/or visible alarm signal.

According to another aspect, the invention relates to a machine for forming successive containers from successive initial preforms, comprising at least a heating station arranged to deliver successive heated preforms from the successive initial preforms and a forming station, the forming station comprising means for injecting an incompressible liquid in heated preforms to form successive container into the forming station, the machine further comprising an analyzing device arranged to carry out the analyzing step of a method as described above.

According to other features of the machine according to the invention:
the analyzing device comprises at least a upstream optical device placed upstream the heating station and a downstream optical device placed between the heating station and the forming station, both the upstream optical device and the downstream the optical device being arranged to acquire at least one image or film of each preform to be analyzed, the analyzing device being arranged to determine a maximal lateral flexion value of each of the successive heated preforms; and
the analyzing device comprises interferometer device provided with a source of circularly polarized light and a device for acquiring through a second crossed polarizer the interference image or film of the polarized light passed through each preform, the interferometer device being placed upstream of the heating station.

BRIEF DESCRIPTION OF THE DRAWINGS

Other aspects and advantages of the invention will appear upon reading the following description, given by way of example and made in reference to the appended drawings, wherein:

FIG. 3 is a diagrammatical view of an interference image of a polarized light passed through a preform when the internal stress has an acceptable intensity and an acceptable distribution;

FIG. 4 is a diagrammatical view of interference images of a polarized light passed through various preforms when the internal stress does not have an acceptable intensity or an acceptable distribution.

DETAILED DESCRIPTION OF THE INVENTION

In the specification, the terms "upstream" and "downstream" are relative to the direction of circulation of the preforms and of the containers formed in the production system.

Figure 1:
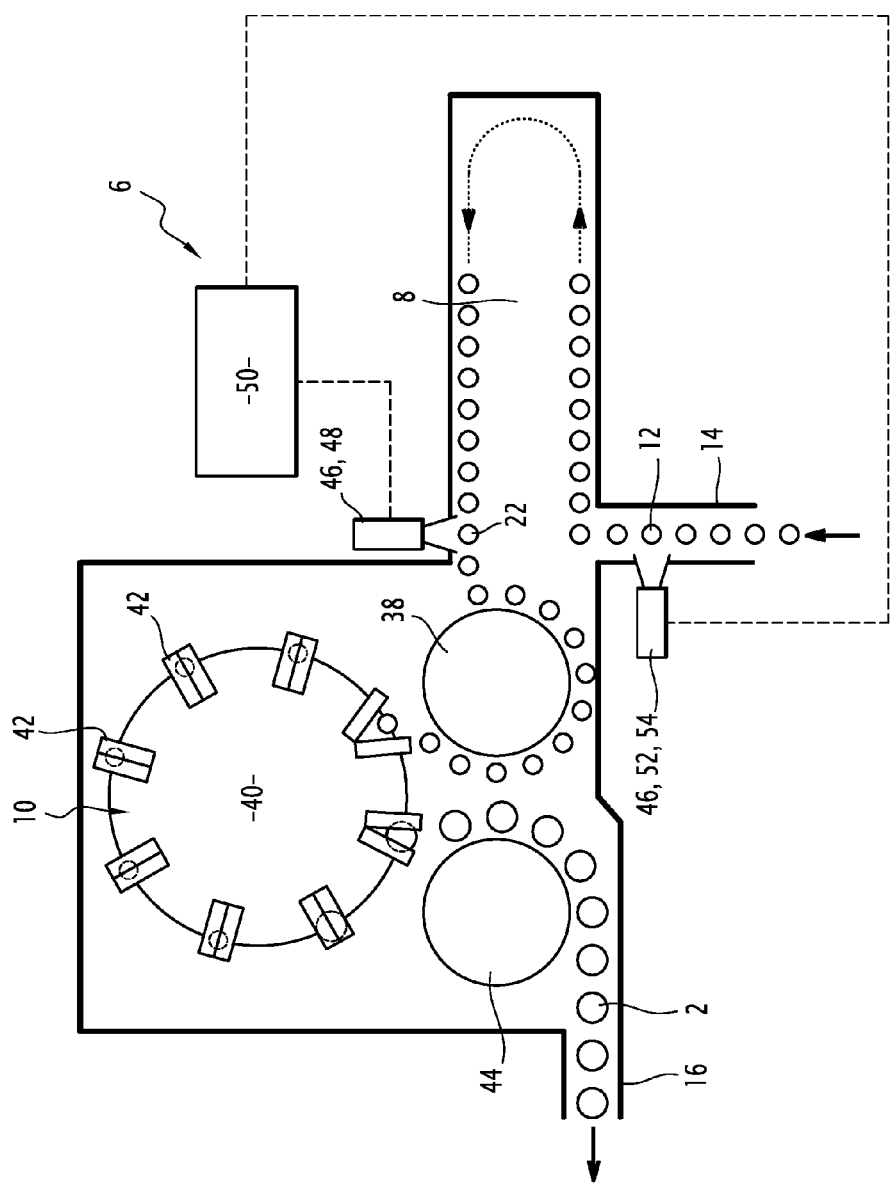
FIG. 1 is a diagrammatical view from above of a machine for producing containers from preforms allowing carrying out any of the methods according to the invention.

Referring to FIG. 1, there is described a production system for producing containers 2 by injecting a pressurized liquid in successive preforms.

Apart from the preform analyzing device which will be described subsequently, the production system comprises a forming machine 6 which is conventional in the technical field of hydroforming of preforms. The forming machine 6 is equipped with a heating station 8 and with a forming station 10. Initial preforms 12 enter the heating station 8 at an inlet 14 at an upstream portion of the machine 6, and the containers 2 exit the forming station 10 at an outlet 16 at a downstream portion of the machine 6. The forming machine 6 further comprises means for transporting the initial preforms 12 from the inlet 14 to the forming station 10 and for transporting formed containers 2 from the forming station 10 to the outlet 16.

A succession of initial preforms 12 is placed in the forming machine 6 at the inlet 14 thereof. The initial preforms 12 are successively heating by the heating station 8, meaning that the heating of each of the initial preforms 12 starts successively the one after the other and ends in the same order. The expression "heated preforms 22" will designate the preforms coming out of the heating station 8.

Each initial preform 12 is previously produced by injecting a thermoplastic material in a molding cavity having the shape of the preform to be obtained. The thermoplastic material is for example chosen among the polyesters, such as polyethylene terephthalate (PET), polyethylene naphthalene (PEN), polyethylene imine (PEI), polytrimethylene terephthalate (PTT), polylactic acid (PLA), polyethylene furanoate (PEF), or polyolefins, such as polyethylene low density (LDPE) or high density (HDPE), polypropylene (PP), or styrene based materials such as polystyrene (PS), or other polymers, such as polyvinyl chloride (PVC) or a mix of these materials.

Figure 2:
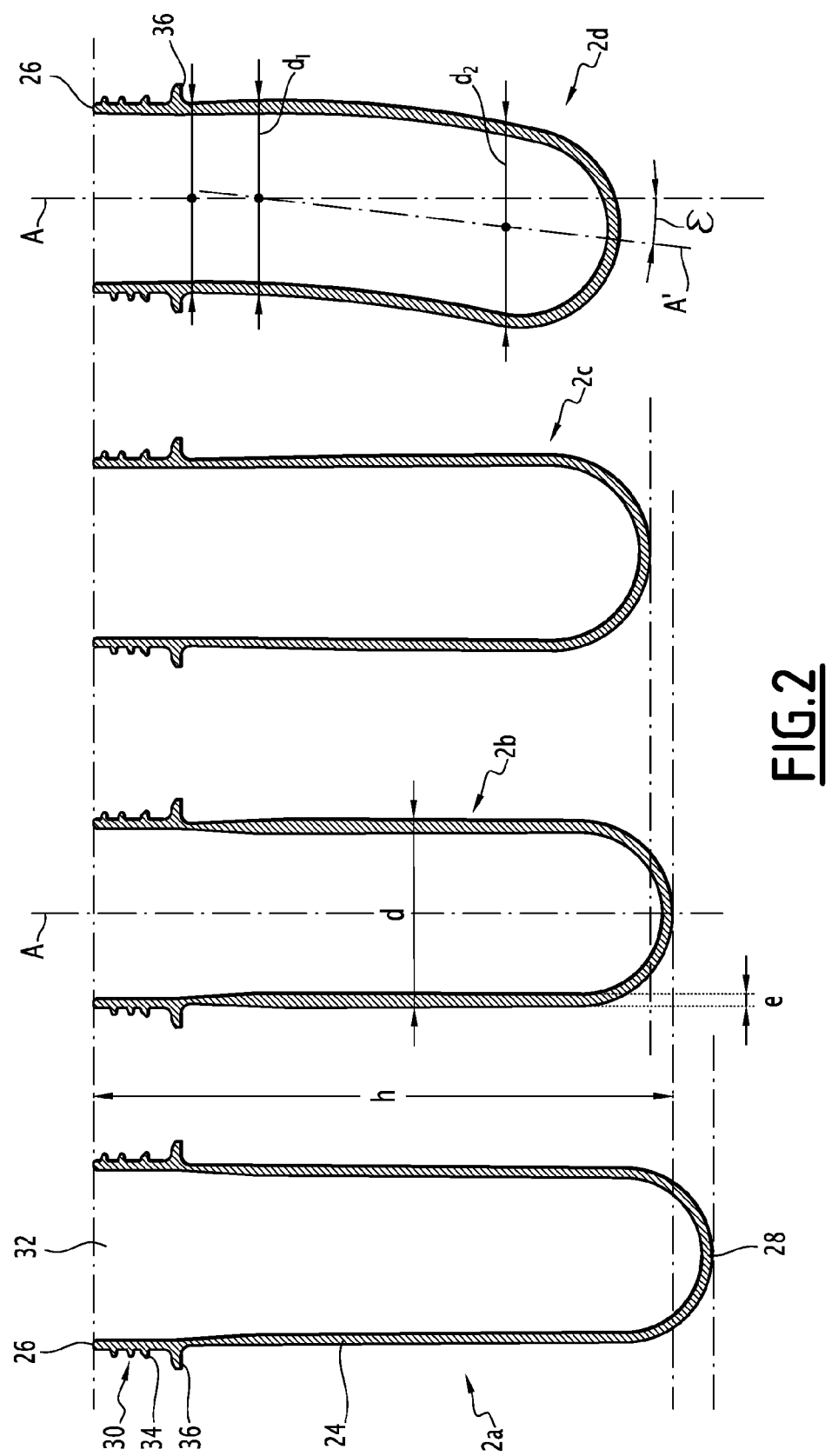
FIG. 2 is a diagrammatical section view of various preforms having different stress parameter values correlated to the internal stress of the thermoplastic material of the preforms.

Each initial preform 12 has for example the general shape of a test tube. Consequently, each initial preform 12 comprises a body 24 having the shape of a tube extending along a longitudinal axis A and having a U shape in longitudinal cross-section, i.e. in an axial plane containing the longitudinal axis A. The initial preforms 12 have an open extreme part 26 at one end and, at the other end, a closed extreme part 28, as shown in FIGS. 2 and 3. The open extreme part 26 has for example the final shape of the neck 30 of the container to be shaped, meaning that the shape of the neck 30 will not be modified during the container forming process. The neck 30 defines an inner opening 32 extending along the longitudinal axis A and delimited by a wall with an external face for example provided with a thread 34 allowing the container 2 to receive a cap by screwing. The closed extreme part 26 has for example a hemispherical shape. The above described shape is given as a non-restricting example and other shapes can be foreseen, for example another shape of the neck 30, without a thread, comprising or not an outer shoulder 36 extending radially substantially perpendicular to the longitudinal axis A.

The initial preforms 12 can be produced at location other than the location of the forming machine 6, such that the preforms are stored and shipped together to the location of the machine.

Alternatively, the initial preforms 12 can be produced at the same location as the location of the forming machine 6 such that the injected preforms are transferred to the inlet of the forming machine 6. This allows reducing the energy required for heating the preforms before the forming step.

Such an injection process, wherein the thermoplastic material is injected in a molding cavity at a temperature at which said thermoplastic material is viscous in order to fill the cavity and is then cooled down to become a rigid preform, leads to the presence of an internal stress in the material of the preform, due to the differences in the material flow, in the cooling speed, in the material pressure, etc. at different locations of the molding cavity, in particular depending on the distance between these locations from the injection nozzle(s) of the thermoplastic material in the molding cavity, and on the settings of the maintaining pressure arranged to compensate the material density variations during the cooling down. Preforms having a small thickness, for example in the vicinity of 1.5 mm, are particularly likely to be subjected to very high levels of internal stress. This internal stress can lead to differences in the behavior of the preform during its deformation in the forming process when the preform has been heated, which releases the internal stress, as described previously.

The dimensions of the initial preforms 12 depend on the container 2 to be produced. The height h of the preform 12 is defined as the length of the preform from its closed extreme part 28 to its open extreme part 26 according to the longitudinal axis A and its diameter d as being the greatest diameter of the body 24 in a radial plane perpendicular to the longitudinal axis A, as shown in FIG. 2. The thickness e of the preform is defined as being the distance between the outer face and the inner face of the preform.

As an example for producing containers of the bottle type, the height h is comprised between 40 mm and 160 mm, the diameter d is comprised between 16 mm and 45 mm and the thickness e is in the range of 1.5 mm to 7 mm.

The initial preforms 12 are transmitted to the inlet 14 of the heating station in which they circulate for example one after the other following a path having a length arranged for the preforms to be at a predetermined temperature at the outlet of the heating station 8. The heating station 8 is formed of an oven comprising for example a heated enclosure made of one or more modules and means for transporting the preforms along a determined path in the heated enclosure. According to an embodiment, the transporting means are furthermore arranged to make the preforms rotate around their longitudinal axis A during the heating along the path in order to ensure an homogenous heating on the whole circumference of the heated preform 22. Such an oven is known and will not be described in greater detail herein.

At the outlet of the heating station 8, the heated preforms 22 are at a temperature comprised between the glass transition temperature of the material of the preform and its crystallization temperature, in order to obtain, at the outlet of the heating station 8, soft heated preforms 22 able to be deformed under the influence of a pressure injected inside the heated preforms 22, i.e. malleable preforms. The temperature is such that the preforms however still maintain their shape at the atmospheric pressure, meaning that they do not tend to be deformed without any pressure applied on them. As an example, for a preform made of PET in the dimensions range mentioned previously, the preform is heated at a temperature comprised between 100° C. and 140° C. It should however be noted that the more the preform has to be subjected to a greater expansion along an axial direction and/or along radial directions, the more the preform is heated at a temperature over the glass transition temperature, but without reaching the crystallization temperature, for example around 135° C. for a preform made of PET in the dimensions range mentioned previously. Consequently, for preforms having a high bi-orientation rate, defining the cumulated axial elongation and radial expansion to which the preform has to be subjected, one wants to work at the highest possible temperatures, but without crystallizing the material of the preform, in order to allow the preform to be deformed easily enough to reach the wanted shape of the container without the appearance of an overstretching of the material, possible with a temperature not high enough and/or of an high stretching rate.

The heated preforms 22 are then transferred, for example by means of a transfer wheel 38, from the outlet of the heating station 8 to the inlet of the forming station 10, as shown in FIG. 1.

The forming station is for example formed, in a known manner, by a wheel 40, movable in rotation around a longitudinal axis and carrying a plurality of sub-stations (not shown) arranged to each receive a preform 22 and to inject a pressurized liquid inside the preform 22. To this end, each sub-station for example comprises a mold 42, defining a molding cavity having the shape of the container to be produced and receiving the preform 22, and a liquid injection nozzle arranged to inject the liquid in the heated preform 22. In a known manner, the injection nozzle is placed in liquid tight fluidic communication with the inner opening 32 of the preform in the mold 42 and injects the liquid at a first pressure in order to deform the preform, the body 24 of which expands towards the wall of the molding cavity. Then, when the preform has almost completed its deformation, the injection nozzle injects the liquid at a second pressure, greater than the first pressure, in order to create a pressure peak in the preform, which allows to completely urge the wall of the preform against the wall of the mold such that the container is completely formed. The liquid injected into the preform is advantageously the liquid intended to fill the container and to be provided to the end user of the container such that the forming and the filling of the container occur in a single step. The expansion step of the preform can be assisted by a stretch rod pressing against the closed extreme part 28 of the preform in order to assist the axial deformation of the preform. Such a method for producing containers by injecting a liquid inside a preform is known for example from document U.S. Pat. No. 7,914,726 and will not be described in greater detail herein.

The formed and filled containers 2 are then retrieved at the outlet of the forming station 10 and transferred to the outlet 16 for example by a transfer wheel 44. The formed and filled containers are advantageously transferred to a capping station (not shown) arranged to close the filled containers 2, for example with a cap or a foil before reaching the outlet 16 of the forming machine 6.

As mentioned previously, when the internal stress of the material of the preform is of an intensity greater than a maximal intensity or when the internal stress is not properly distributed in the preform, the forming and filling step described above can lead to a bursting of the container obtained from the preform, the liquid filling the containers then being spilled in the forming machine 6 and soiling the forming machine. In the following description, the terms "satisfactory preform" will designate a preform having an internal stress allowing limiting the axial and radial deformations of the preform after heating said preform, meaning that it allows the production of a container which is not likely to burst, and the terms "unsatisfactory preform" will designate a preform having an internal stress which is likely to cause a bursting of the container during its forming and filling.

In order to check the quality of the preforms circulating in the forming machine 6, the forming machine 6 comprises an analyzing device 46 for analyzing the preforms arranged to determine the value of at least one parameter correlated to the internal stress of the thermoplastic material of each preform, subsequently called stress parameter, and to compare this determined value to an acceptable range of values for this stress parameter in order to determine if each preform is a satisfactory preform or an unsatisfactory preform.

According to an embodiment of the method according to the invention, the stress parameter is in relation with the distribution of the internal stress in the material of the preform and is defined by the variation of height of the analyzed preform relative to a satisfactory preform for a given heating temperature. This parameter can be estimated by observing the preform and by measuring the height gap between the observed preform after its heating and a satisfactory preform after its heating.

Indeed, as mentioned previously, during the preform heating step, the internal stress in the material of the heated preform 22 is released, which causes a reduction of the height and an increase of the diameter of the preform relative to the initial preform 12.

In FIG. 2, reference 2a designates an initial preform and reference 2c designates a reference preform having an acceptable maximum retraction. Reference 2b shows a heated preform 22 having a body 24 which would extend in the longitudinal axis and which would be acceptable for the given heating temperature, meaning that the height h of the preform 2b would be comprised between the one of the initial preform 12 (in the case where almost no internal stress would have to be released during the heating step) and the one of the reference preform having a maximum retraction (in the case where an acceptable maximum of internal stress is present in the initial preform 12), the external diameter "d" of the body of the acceptable heated preform 22 having been subjected to a corresponding increase.

In order to implement the method described above, the analyzing device 46 comprises a memory where the images of the reference preforms 2a and 2c are stored, the reference preforms images constituting the gauge determining the acceptable values range for the axial retraction.

The analyzing device 46 comprises a downstream optical device 48 placed downstream of the heating station 8 and arranged to determine the shape of the heated preform 22.

In addition, the analyzing device 46 comprises an upstream optical device 52 arranged opposite the initial preforms 12, upstream of the heating station 8 and arranged to determine the shape of the initial preforms 12.

The analyzing device 46 comprises a control unit 50. The control unit 50 is connected to the transportation means transporting the preforms to the inlet of the heating station. The control unit 50 is equipped with calculation means for comparing the shape of the heated preform 22 and the shape determined a few moments earlier by the upstream optical device 52 when the same preform was still located opposite the upstream optical device 52 to the shapes of the two reference preforms 2a, 2c.

Furthermore, a sensor (not shown) for sensing the temperature of the heated preform 22 could be provided and a formula for correcting the acceptable retraction of the satisfactory preform depending on the temperature of the heated preform 22 could be applied. This formula can for example be determined by preliminary trials on preforms of the type of the initial preform 12. The control unit 50 is arranged to determine if the analyzed heated preform 22 has an acceptable axial retraction.

According to a variant of the method, the value of the axial retraction due to the heating, for a given initial preform 12, is measured directly without referring to a gauge. To implement this variant, the control unit 50 comprises a memory storing a maximal value of acceptable axial retraction. The control unit 50 is able to calculate the axial retraction of a preform between the shape of the initial preform 12 and the shape of the heated preform 22. Furthermore, a sensor (not shown) for sensing the temperature of the heated preform 22 could be provided and a formula for correcting the acceptable retraction could be applied. The analyzing means 46 is able to compare this value to the maximum acceptable axial retraction value and to emit a signal accordingly.

A similar analysis as the one described above could be realized using as the stress parameter the external diameter of the body 24 of each preform and by measuring the diameter gap between the observed preform before and after its heating and a satisfactory preform after its heating.

According to another embodiment, a stress parameter is the maximal circumferential dispersion of the internal stress of the thermoplastic material, measured on the whole height of the analyzed preform.

This embodiment can be combined to any above embodiments. The preform is considered not satisfactory, when at least one of the stress parameters is out of acceptable value range.

Instead of directly measuring this parameter, the method proposes to determine the magnitude of this stress parameter by observing in real time one effect of this parameter. Indeed, if the internal stress varies along a diameter of the initial preform 12, the release of the internal stress during the heating step causes a flexion of the corresponding heated preform 22. The method comprises the step of observing the preform and of measuring the flexion of the preform in at least one axial plane containing the longitudinal axis A, i.e. measuring a deformation of the preform according to a radial direction relative to its longitudinal axis A. This phenomenon is known as the "banana effect" due to the shape acquired by the preform at the outlet of the heating station 8. The acceptable maximal value is determined by a gauge designated by reference 2d in FIG. 2.

As illustrated by the reference 2d, the external diameter may be measured at at least one height close to the height of the closed end 28 of the preform and following different angles around the axis An as illustrated by diameter d2 in FIG. 2. This measurement of the diameter can also be performed at another height of the preform, for example as illustrated by diameter d1 of FIG. 2. Then, the center(s) of the external diameter(s) is (are) determined by calculation of the like (shown by a dash dot). The axis A of the neck 30 is determined for example by image analysis as being the axis passing by the center of the neck and being perpendicular to the plane of the outer shoulder 36 or the plane of the open extreme part 26. An axis A' can be determined by calculation as passing by the center of the neck and by the center(s) of the measured diameter(s). An acceptable maximum angular offset "$\varepsilon_{max}$" between the axis A and A' is beforehand determined as being the maximum angular offset for a preform that can be accepted which the preform remains a satisfactory preform. Such a stress parameter is representative of the acceptable maximal lateral flexion for a preform.

Consequently, any heated preform 22 having an axis A' with an angular offset "$\varepsilon$" with respect to the axis A greater than the maximum angular offset "$\varepsilon_{max}$" will be considered as an unsatisfactory preform. On the contrary, a heated preform 22 having an angular offset between axis A and A' smaller or equal to "$\varepsilon_{max}$" will be considered as a satisfactory preform.

The acceptable value range for that stress parameter can be additionally or alternatively determined by a diameter range at a particular height of measurement comprised between a minimal acceptable diameter $d_{min}$ and a maximal acceptable diameter $d_{max}$. In other words, if for a given heated preform, d1 and/or d2 is comprised between the minimal acceptable diameter $d_{min}$ and the maximal acceptable diameter dmax determined for the height at which d1 and/or d2 is measured, the preform is considered as satisfactory Conversely, any heated preform 22 having one or all the diameter "d" measured at a particular height outside the corresponding acceptable range between dmin and $d_{max}$ will be considered as an unsatisfactory preform.

Several images of each heated preform 22 are acquired. Indeed, in order to determine if a part of the wall of the heated preform 22 is located outside the acceptable values range, it is necessary to check the gap or angle between the wall of the preform and the longitudinal axis A on the whole circumference of the heated preform 22, i.e. at different angular positions of the preform, since the deformation does not occur in all the axial planes of the preform. In order to implement the method described above, the forming machine 6 comprises means for rotating the heated preforms 22 around their longitudinal axis A. The control unit 50 acquires several images of the heated preform 22 in different angular positions of the preform opposite the downstream optical device 48. The angular distance between two pictures of the preform is arranged such that a deformation of the profile of the preform can be detected whatever the axial planes, in which the gap/angle relative to the longitudinal axis A occurs, are. Consequently, the preform is turned by an angle equal to or less than 90° between two successive pictures, preferably by an angle equal or less than 45°. According to a variant, a film of the heated preform 22 is made during its rotation in order to obtain a plurality of images of the profile of the heated preform 22.

The acquired images or film are then transferred to the control unit 50 and compared to the reference gauge according to FIG. 2d. Furthermore, a sensor (not shown) for sensing the temperature of the heated preform 22 could be provided and a formula for correcting the acceptable retraction depending on the temperature of the heated preform 22 could be applied. If one of the acquired images or one of the images of the film shows a profile of the preform radially diverging more than the reference gauge 2d, then it is determined that the analyzed preform is unsatisfactory.

It should be noted that in the above description, the comparing step of the measured value of the stress parameter with the acceptable values range for this stress parameter has been described as a comparison of images. It is however not necessary that images are compared. The images can simply be analyzed for determining the measured value of the stress parameter and then this value can be compared with the range of acceptable values which has been determined for a satisfactory preform. For example, the value of the lateral flexion can be calculated for each acquired image and each measured lateral flexion is compared to a pre-stored acceptable maximal reference value for this flexion.

In addition or alternatively to the parameters described above, the variation of the maximal circumferential dispersion of the internal stress of the thermoplastic material, measured on the whole height of the analyzed preform, between the initial preform 12 and the heated preform 22, or maximum real deformation, can be chosen as a stress parameter.

In addition to the parameters described above, the standard deviation of the height variation to which an initial preform 12 is subjected during its passage in the heating station 8 can be chosen as a stress parameter. Indeed, as mentioned previously, the release of the stress in the preform during its heating can make the height h of the preform vary relative to its height before heating.

The downstream optical device 48 and/or the upstream optical device 52 can for example be a camera acting in the visible range. Distance or profile optical sensors can also be used (confocal, interferometric, laser triangulation, . . . ).

According to another embodiment, a stress parameter value is determined by the acquisition of one or several interference images or of an interference film of a polarized light passed through each preform 12 circulating in the machine before said preform circulates in the heating station, i.e. a polarized light passed through a cold preform 12.

This embodiment is combined to any above embodiment, in which a stress parameter is measured after the heating step.

Alternatively, only the maximal circumferential dispersion of the internal stress of the thermoplastic material as described previously is measured in combination with the analysis with polarized light.

The preform is considered not satisfactory, when at least one of the stress parameters is out of acceptable value range.

In order to implement the method described above, the forming machine 6 comprises a device 54 arranged upstream of the heating station 8 and comprising a source of circularly polarized light and of a camera able to acquire through a second crossed circular polarizer and image of the incident polarized light transmitted by the initial preform 12. This interference image or succession of interference images allow observing the magnitude or intensity and the distribution of the internal stress of the material of the preform, as it has been shown in FIGS. 3 and 4. Indeed, in such interference images, the internal stress causes the presence of interference fringes 56 in the shape of successive waves or flames, extending in the wall of the preform, the distribution and the shape of these fringes 56 giving information on the distribution and magnitude of the internal stress in the material of the preform.

On FIG. 3, it has been shown an interference image obtained in a white or monochromatic light between crossed polarizers for a satisfactory reference preform. This image can be used as a gauge allowing comparing the interference images obtained for each preform circulating in the machine in order to determine if the distribution and the magnitude of the internal stress are satisfactory or not. To this end, a frame 58 is defined, inside which the two dimensional interference image will be analyzed. The frame 58 extends for example on the body 24 of the initial preform 12 away from the neck 30 in order to obtain a sample representative of the distribution and of the magnitude of the internal stress in the material of preform located in the frame 58. When the image is obtained in white light, the order number of the fringes can be determined, for example by color analysis. Preferably the frame 58 is rectangular and extends in height and in width on the major part of the initial preform 12, for example around 90% of the cylindrical portion of the initial preform 12 and around 50% or 70% of the width of the initial preform 12. The two dimensional image of the initial preform 12 is analyzed, for example by counting the number of fringes 56 extending inside this frame 58 and/or by measuring the position of the summit of the fringes 56 inside the frame 58. The number and/or the position of the fringes 56 are compared to an acceptable values range defined by a maximal number of fringes 56 and/or by a tolerance in the position of these fringes 56 inside the frame 58 for a satisfactory preform. Consequently, if the number of fringes 56 counted inside the frame 58 of an interference image coming from a light passed through an initial preform 12 is greater than the maximal number of fringes and/or if the measured position of these fringes is closer to the neck 30 than in the image of the satisfactory preform, then the analyzed initial preform 12 is considered as being unsatisfactory, as shown by preforms 4a and 4c of FIG. 4, wherein the number of fringes 56 located inside the frame 58 is far greater than the number of fringes 56 located inside the frame 58 of the satisfactory reference preform of FIG. 3.

In addition to the number of fringes 56 inside the frame 58, the stress parameter can also comprise a symmetry degree of the fringes 56 inside the frame 58. An axis of symmetry can be defined passing by the center of the frame 58, said axis of symmetry being for example defined by the longitudinal axis A of the initial preform 12, and the symmetry of the fringes 56 relative to this axis of symmetry can be checked. A maximal symmetry default can be defined over which the preform will be considered as unsatisfactory. For example, the symmetry default can be defined as percentage relative to the number of fringes located inside the frame 58, of the symmetrical fringes relative to the axis of symmetry in the frame 58. Consequently, if the percentage of symmetrical fringes in the frame 58 of an interference image related to a given preform is insufficient, this given preform will be considered as unsatisfactory. This has been shown by preform 4c of FIG. 4, wherein the fringes 56 located near the closed extreme part 28 of the preform are not symmetrical relative to the longitudinal axis A.

As for the stress parameter connected to the flexion of the heated preform 22, the analysis of the fringes 56 is improved if several images acquired in different angular positions of the preform are acquired in order to obtain a representation of the internal stress in the material of the analyzed preform on the most possible part of the circumference of the preform. In conclusion, if the number of fringes 56 is less than the acceptable limit (FIG. 4b) and/or the symmetry default of the fringes 56 is less than the maximal default and/or the fringes 56 are homogenous on the whole circumference, then the initial preform 12 is satisfactory.

In order to implement the analysis described above, the analyzing device of the machine according to this other embodiment comprises a source circularly polarized light and a device for acquiring interference images or films of the polarized light having passed through each preform. The light source, the two circular crossed polarizers and the acquisition device are arranged on either side of part of the path of the initial preforms 12 between the inlet 4 and the heating station 8 of the machine such that each preform passes between the light source, the two polarizers and the acquisition device upstream of the heating station 8. Using the transportation means of this station to transport the preforms between the light source and the acquisition device, the preforms can be rotated around their axis during the acquisition of images in order to obtain images in different angular positions of each preform.

Once the interference images or film is/are acquired, the control unit 50 is used to determine the value of the stress parameter(s), for example the number of fringes 56 (or the maximum order number of fringe in white light) inside the frame 58 and/or the homogeneity of the fringes along the circumference and/or the symmetry default of the fringes inside the frame, and to compare said value to the acceptable values range for the heating temperature of the heating station 8 at the time of the analysis such that it is determined for each preform circulating in the machine if the preform is satisfactory or unsatisfactory.

Alternatively or in addition to the above-described parameters, the variation of the stress parameter(s), for example the number of fringes 56 (or the maximum order number of fringe in white light) inside the frame 58 and/or the homogeneity of the fringes along the circumference and/or the symmetry default of the fringes inside the frame, between the initial preform 12 and the heated preform 22 can be chosen as a stress parameter.

The continuous determination and for each preform circulating in the machine of the conformity of the preforms allows ensuring a continuous check of the quality of the preforms used to make containers.

When an analyzed preform is determined as being unsatisfactory while the heating process and preform temperature are consider as stable and under control, the method according to the invention comprises the emission by the machine, for example by its control unit 50, of an output signal. This signal is therefore emitted when the measured value of one or of at least one of the stress parameters is outside the acceptable values range for this stress parameter.

The output signal can be exploited in several manners.

The output signal can simply be an audible and/or visible signal to the intention of the users of the machine in order to inform them of the presence of an unsatisfactory preform in the machine and of the risk of bursting of a container.

As a variant or in addition, the output signal can be used to trigger an ejection of the unsatisfactory preform before the preform is subjected to the forming and filling step. In this manner, it is made sure that only satisfactory preforms are formed into containers, thereby greatly reducing the risks of bursting.

Figure 5:
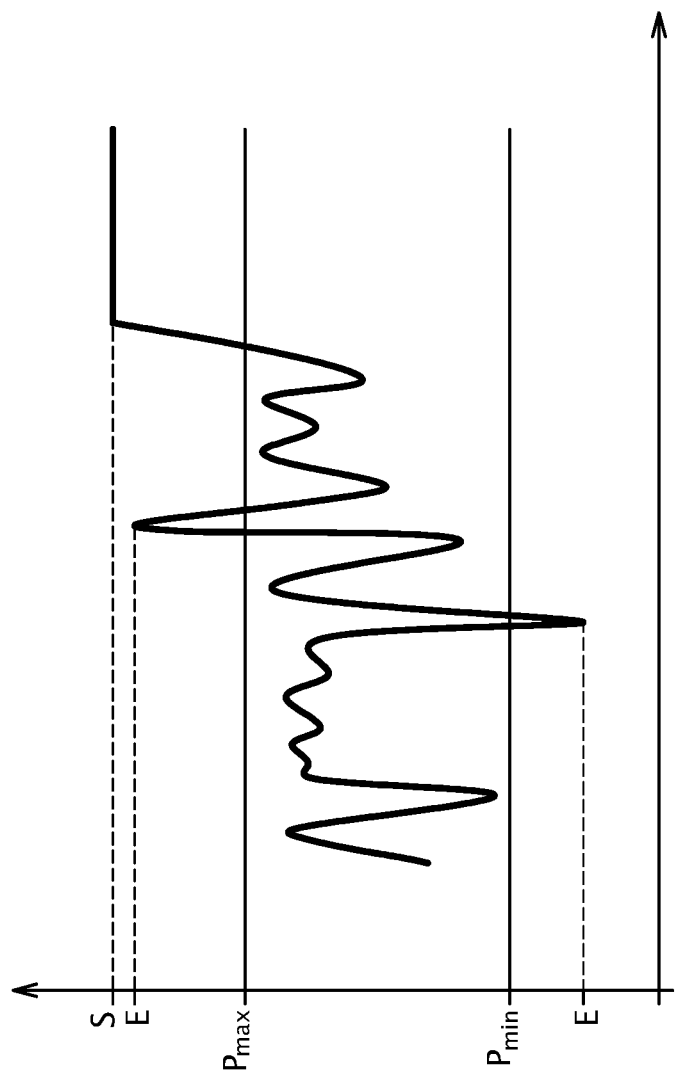
FIG. 5 is a diagram showing the value of the internal stress of successive preforms circulating in the machine for producing containers according to the invention.

On FIG. 5, a diagram is shown showing on the X axis the succession of analyzed preforms and on the Y axis the measured value of the stress parameter. Lines $P_{min}$ and Pmax represent respectively the lower limit and the upper limit of the acceptable values range for the measured stress parameter.

Points E of the Y axis of this diagram designate preforms for which an ejection of the preform is triggered. Indeed, at these points E, one can see that the measured value of the stress parameter is outside the range defined by $P_{min}$ and by Pmax.

At point S, an important succession of preforms, having a measured value of the stress parameter outside the acceptable values range for the used heating temperature, has been identified. Such a case can occur for example when a whole batch of preforms has not been produced with satisfactory injection parameters or with an acceptable material. If such a succession, causing the continuous emission of an output signal, is identified, the output signal can be used to stop the machine, in order to retrieve the batch of unsatisfactory preforms and replace them by another batch of preforms and thus prevent that multiple burstings of containers occur.

For example, the fact of having a continuous and statistical record of at least one parameter correlated to the quality of a batch of preforms can help to verify whether the quality of the formed containers 2 depends a lot or not on the recorded values on the preforms.

The method and the machine described above allow checking continuously, or "in line", the quality of the preforms circulating in the machine by means of the analysis of a parameter correlated to the internal stress in the material of the preform in order to determine the causes of an eventual bursting of a container produced in the machine. It should be noted that the analysis of a parameter correlated to the internal stress is different from a thermic control performed on the heated preforms, used to determine if a preform has been heated in a uniform manner before being shaped into a container. Indeed, such a thermic control, performed for example by means of a thermographic camera, does not allow determining the value of a parameter correlated to the internal stress in the material of a preform.

Analysing the preform before and after the step of heating especially enables measuring various stress parameters, including the axial retraction suffered by each preform during its heating. The axial retraction is related to the release of the internal stress in the material of the preform during the step of heating.

The combination of different stress parameters can improve the detection of non-satisfactory preforms.

The invention claimed is:

1. A method for producing containers from successive initial preforms made of a thermoplastic material, the method comprising the steps of:
   feeding successive initial preforms to a heating station,
   heating the successive initial preforms in the heating station resulting in successive heated preforms,
   feeding the successive heated preforms to a forming station,
   injecting an incompressible liquid into each of the successive heated preforms shaping each of the successive heated preforms into containers and filling the containers with the incompressible liquid in the forming station,
   defining at least one stress parameter correlated to an internal stress of the thermoplastic material and defining a range of acceptable values for the at least one stress parameter,
   analyzing each of the successive heated preforms, the analyzing step further comprising the steps of:
   determining a determined value of the at least one stress parameter for each of the successive heated preforms, the determined value being determined prior to the injection of an incompressible liquid into each of the successive heated preforms,
   comparing the determined value to the range of acceptable values and identifying when the determined value is outside of the range of acceptable values for a given preform,
   emitting an output signal when the determined value is outside the range of acceptable values.

2. The method according to claim 1, wherein the at least one stress parameter is the maximal circumferential dispersion of the internal stress of the thermoplastic material, measured along a height of the successive initial preforms and the successive heated preforms analyzed in the analyzing step.

3. A method for producing containers from successive initial preforms made of a thermoplastic material, the method comprising the steps of:
   feeding successive initial preforms to a heating station,
   heating the successive initial preforms in the heating station resulting in successive heated preforms,
   feeding the successive heated preforms to a forming station,
   injecting an incompressible liquid into each of the successive heated preforms shaping each of the successive heated preforms into containers and filling the containers with the incompressible liquid in the forming station,
   defining at least one stress parameter correlated to an internal stress of the thermoplastic material and defining a range of acceptable values for the at least one stress parameter,
   analyzing each of the successive initial preforms and each of the successive heated preforms, the analyzing step further comprising the steps of:
   determining a determined value of the at least one stress parameter for each of the successive initial preforms and each of the successive heating preforms, wherein the step of determining the determined value of the at least one stress parameter is performed on each of the successive initial preforms and each of the successive heated preforms prior to the injection of an incompressible liquid into each of the successive heated preforms,
   comparing the determined value to the range of acceptable values and identifying when the determined value is outside of the range of acceptable values for a given preform,
   emitting an output signal when the determined value is outside the range of acceptable values.

4. The method according to claim 3, wherein the determining step is performed by acquiring at least an image of each of the successive initial preforms and at least an image of each of the successive heated preforms and the step of comparing is performed by comparing the acquired images to at least a reference image of a reference heated preform having an acceptable maximal lateral flexion value.

5. The method according to claim 4, wherein each of the successive heated preforms is moved in rotation at least during the determining step, the determining step being performed by acquiring a plurality of images of each of the successive heated preforms at different angular positions of each of the successive heated preforms and by processing the acquired plurality of images in order to identify at least one acquired image corresponding to the maximal lateral flexion of each of the successive heated preforms, the step of comparing being performed by comparing the at least one identified acquired image to the reference image.

6. The method according to claim 3, wherein the at least one stress parameter is at least one of a variation of height and an exterior diameter of a body of each of the successive initial preforms and each of the successive heated preforms, the determining step including measuring at least one of the height and the exterior diameter of a body of each of the successive initial preforms preforms, measuring at least one of the height and the exterior diameter of a body of each of the successive heated preforms and a determining a variation of the at least one of the height and the exterior diameter.

7. The method according to claim 3, wherein the at least one stress parameter is an internal stress intensity of the thermoplastic material of each of the successive initial preforms and each of the successive heated preforms.

8. The method according to claim 7, wherein the step of determining the determined value includes exposing each of the successive initial preforms to a circularly polarized light and by acquiring through a second crossed circular polarizer an acquired interference image of incident polarized light passed through each of the successive initial preforms and the step of comparing is performed by comparing the acquired interference image to a reference interference image of a polarized light passed through at least one reference preform, the at least one reference preform having a reference stress parameter value in or at an extreme of the range of acceptable values.

9. The method according to claim 3, wherein the step of injecting the incompressible liquid into the given preform is not performed when the output signal has been emitted in connection with the given preform.

10. The method according to claim 3, wherein the output signal is one of an audible and visible alarm signal.

11. The method according to claim 3 performed on a machine for forming successive containers comprising a heating station configured to produce the successive heated preforms from the successive initial preforms and a forming station, the forming station including an injection head configured to inject an incompressible liquid in the successive heated preforms to form the successive containers, and an analyzing device configured to carry out the analyzing step.

12. The method according to claim 11, wherein the analyzing device of the machine comprises at least an upstream optical device located upstream the heating station and a downstream optical device located between the heating station and the forming station, both the upstream optical device and the downstream optical device being arranged to respectively acquire at least one image of each of the successive initial and heated preforms, the analyzing device being configured to determine a maximal lateral flexion value of each of the successive heated preforms.

13. The method according to claim 3, wherein the upstream optical device comprises an interferometer device having a source of circularly polarized light and a device configured to acquire through a second crossed polarizer an interference image of the polarized light passed through each of the successive initial preforms.

14. A method for producing containers from successive initial preforms made of a thermoplastic material, the method comprising the steps of:

feeding successive initial preforms to a heating station,
heating the successive initial preforms in the heating station resulting in successive heated preforms,
feeding the successive heated preforms to a forming station,
injecting an incompressible liquid into each of the successive heated preforms shaping each of the successive heated preforms into containers and filling the containers with the incompressible liquid in the forming station,
defining at least one stress parameter correlated to an internal stress of the thermoplastic material and defining a range of acceptable values for the at least one stress parameter,
analyzing each of the successive heated preforms, the analyzing step further comprising the steps of:
determining a determined value of the at least one stress parameter for each of the successive heated preforms,
comparing the determined value to the range of acceptable values and identifying when the determined value is outside of the range of acceptable values for a given preform,
emitting an output signal when the determined value is outside the range of acceptable values,
wherein the step of injecting the incompressible liquid into the given preform is not performed when the output signal has been emitted in connection with the given preform, and
wherein the given preform is ejected from a molding machine.

15. A method for producing containers from successive initial preforms made of a thermoplastic material, the method comprising the steps of:

feeding successive initial preforms to a heating station,
heating the successive initial preforms in the heating station resulting in successive heated preforms,
feeding the successive heated preforms to a forming station,
injecting an incompressible liquid into each of the successive heated preforms shaping each of the successive heated preforms into containers and filling the containers with the incompressible liquid in the forming station,
defining at least one stress parameter correlated to an internal stress of the thermoplastic material and defining a range of acceptable values for the at least one stress parameter,
analyzing each of the successive heated preforms, the analyzing step further comprising the steps of:
determining a determined value of the at least one stress parameter for each of the successive heated preforms,
comparing the determined value to the range of acceptable values and identifying when the determined value is outside of the range of acceptable values for a given preform,
emitting an output signal when the determined value is outside the range of acceptable values, and
wherein the step of injecting the incompressible liquid into the given preform is not performed when the output signal has been emitted in connection with the given preform.

* * * * *